(12) United States Patent
Ng et al.

(10) Patent No.: US 12,384,445 B2
(45) Date of Patent: Aug. 12, 2025

(54) ENERGY ABSORBING DEVICE AND STEERING COLUMN ASSEMBLY HAVING SAME

(71) Applicant: Atieva, Inc., Newark, CA (US)

(72) Inventors: Meng Ng, Fremont, CA (US); Hayden Hall, San Jose, CA (US); Zachary Mark Walker, Mountain View, CA (US); John Scheick, San Mateo, CA (US); Moises Blancas-Galicia, Newark, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/713,815

(22) PCT Filed: Oct. 25, 2022

(86) PCT No.: PCT/US2022/078647
§ 371 (c)(1),
(2) Date: May 28, 2024

(87) PCT Pub. No.: WO2023/076892
PCT Pub. Date: May 4, 2023

(65) Prior Publication Data
US 2024/0425101 A1  Dec. 26, 2024

Related U.S. Application Data

(60) Provisional application No. 63/263,312, filed on Oct. 29, 2021, provisional application No. 63/263,193, filed on Oct. 28, 2021.

(51) Int. Cl.
*B62D 1/19* (2006.01)

(52) U.S. Cl.
CPC .................................. *B62D 1/197* (2013.01)

(58) Field of Classification Search
CPC .................................. B62D 1/18; B62D 1/17
See application file for complete search history.

(56) References Cited

U.S. PATENT DOCUMENTS

| | | |
|---|---|---|
| 2006/0290128 A1 | 12/2006 | Ridgway et al. |
| 2016/0304114 A1* | 10/2016 | Oehri ...................... B62D 1/195 |
| 2019/0359245 A1* | 11/2019 | Miyai ..................... B62D 1/195 |
| 2020/0198685 A1 | 6/2020 | Anspaugh et al. |

OTHER PUBLICATIONS

International Search Report and Written Opinion for PCT Application No. PCT/US2022/078647, mailed on Feb. 2, 2023, 9 pages.

* cited by examiner

*Primary Examiner* — Jason D Shanske
*Assistant Examiner* — Matthew James O'Neill
(74) *Attorney, Agent, or Firm* — Brake Hughes Bellermann LLP (57) ABSTRACT

An energy absorbing device for a steering column assembly of a vehicle is provided. The energy absorbing device includes tear initiation grooves having offset tear initiation points, such that tearing is initiated in the grooves at different points in time, thus balancing loads experienced during a frontal crash and collapse of the steering column assembly.

19 Claims, 10 Drawing Sheets

ENERGY ABSORBING DEVICE AND STEERING COLUMN ASSEMBLY HAVING SAME

CROSS-REFERENCE TO RELATED APPLICATION

This application is a 35 U.S.C. § 371 National Phase Entry Application from PCT Application No. PCT/US2022/078647, filed on Oct. 25, 2022, entitled "ENERGY ABSORBING DEVICE AND STEERING COLUMN ASSEMBLY HAVING SAME", and designating the U.S., which claims priority to U.S. Provisional Patent Application No. 63/263,193, filed on Oct. 28, 2021, entitled "ENERGY ABSORBING DEVICE AND STEERING COLUMN ASSEMBLY HAVING SAME," and to U.S. Provisional Patent Application No. 63/263,312, filed on Oct. 29, 2021, entitled "ENERGY ABSORBING DEVICE AND STEERING COLUMN ASSEMBLY HAVING SAME," the disclosures of which are incorporated by reference herein in their entireties.

FIELD

This relates to a steering column assembly, and in particular to a steering column assembly including an energy absorbing device.

BACKGROUND

Vehicles may be equipped with systems that provide for energy absorption that reduce the likelihood of injury of vehicle occupants during a collision. One such system may include an energy absorption system incorporated into a steering column of the vehicle, that causes the steering column to collapse in response to an operator impacting the steering wheel in the event of a frontal crash. In some situations, if relatively high impact forces are required to initiate collapse of the steering column, this may result in injury to the operator as the operator impacts the steering wheel, thus degrading vehicle safety and putting the operator at risk.

SUMMARY

In one general aspect, an energy absorbing device for a steering column assembly includes a plate. The plate may include a first portion; a second portion, wherein the first portion and the second portion are configured to be coupled to one or more movable components of the steering column assembly; and a third portion positioned between the first portion and the second portion, wherein the third portion is configured to be coupled to a stationary component of the steering column assembly; The energy absorbing device may include a first groove between the first portion and the third portion of the plate; a second groove between the second portion and the third portion of the plate; and at least one tear initiation slit formed in one of the first groove or the second groove.

In some implementations, the at least one tear initiation slit has a first tear initiation point that is offset relative to a second tear initiation point of the other of the first groove or the second groove.

In some implementations, the at least one tear initiation slit includes a first tear initiation slit formed in the first groove, the first tear initiation slit having a first length; and a second tear initiation slit formed in the second groove, the second tear initiation slit having a second length that is greater than the first length of the first tear initiation slit formed in the first groove.

In some implementations, an initiation of tearing of the second groove is offset from an initiation of tearing of the first groove based on the second length of the second tear initiation slit being greater than the first length of the first tear initiation slit.

In some implementations, an offset between the second length of the second tear initiation slit and the first length of the first tear initiation slit corresponds to an offset between the initiation of tearing of the second groove and the initiation of tearing of the first groove.

In some implementations, tearing of the first groove is initiated before tearing of the second groove is initiated due to the offset between the first length of the first tear initiation slit and the second length of the second tear initiation slit.

In some implementations, the at least one tear initiation slit includes no tear initiation slit formed in the first groove, and a tear initiation slit formed in the second groove, wherein an initiation of tearing of the second groove is offset from an initiation of tearing of the first groove, such that tearing of the first groove is initiated before tearing of the second groove.

In some implementations, the third portion of the plate defines a tear portion of the energy absorbing device that separates from the first portion and the second portion of the plate in response to tearing at the first groove and the second groove.

In another general aspect, a steering column assembly includes a drive spindle; a telescoping shaft coupled to the drive spindle; and an energy absorbing device. The energy absorbing device may include a first plate portion coupled to a portion of the telescoping shaft; a second plate portion coupled to a portion of the telescoping shaft; and a third plate portion positioned between the first portion and coupled to the drive spindle. The energy absorbing device may also include a first groove between the first plate portion and the third plate portion; a second groove between the second plate portion and the third plate portion; and a first tear initiation slit formed in the first groove.

In some implementations, a tear initiation point of the first groove is offset relative to a tear initiation point of the second groove.

In some implementations, the energy absorbing device includes a second tear initiation slit formed in the second groove.

In some implementations, the first tear initiation slit has a first length, and the second tear initiation slit formed in the second groove has a second length that is greater than the first length of the first tear initiation slit formed in the first groove.

In some implementations, an initiation of tearing of the second groove is offset from an initiation of tearing of the first groove based on the second length of the second tear initiation slit being greater than the first length of the first tear initiation slit.

In some implementations, an offset between the second length of the second tear initiation slit and the first length of the first tear initiation slit corresponds to an offset between the initiation of tearing of the second groove and the initiation of tearing of the first groove.

In some implementations, tearing of the first groove is initiated before tearing of the second groove is initiated due to the offset between the first length of the first tear initiation slit and the second length of the second tear initiation slit.

In some implementations, no tear initiation slit is formed in the second groove, and wherein an initiation of tearing of the first groove is offset from an initiation of tearing of the second groove, such that tearing of the second groove is initiated before tearing of the first groove.

In some implementations, the third plate portion defines a tear portion of the energy absorbing device that separates from the first plate portion and the second plate portion in response to tearing at the first groove and the second groove.

The details of one or more implementations are set forth in the accompanying drawings and the description below. Other features will be apparent from the description and drawings, and from the claims.

BRIEF DESCRIPTION OF THE DRAWINGS

In the drawings, like reference symbols or numerals are used to indicate like elements wherever practical

FIG. 2C is a first perspective view.

DETAILED DESCRIPTION

A collapsible steering column assembly may be designed to collapse in the event of a frontal impact that causes the operator of the vehicle to impact the steering wheel. That is, during a frontal collision, the vehicle abruptly decelerates while the operator may continue to move in the direction of travel. This continued movement of the operator in the direction of travel may drive the operator into the steering wheel and impart a force on the steering wheel due to the impact of the driver. Collapse of the steering column in response to this type of crash situation may absorb some of the energy imparted as the operator impacts the steering wheel, and may reduce corresponding impact forces experienced by the operator, thus reducing potential injury to the operator. In some situations, a peak load, or a peak force, is present prior to initiating the collapse of the steering column. An energy absorbing device, in accordance with implementations described herein, may reduce a peak force that develops when initiating the collapse of components of the collapsible steering column, thus reducing impact forces experienced by the vehicle operator. In some implementations, the energy absorbing device may provide for a dynamic release of the coupling of collapsible components of the steering column, thus reducing peak force effects, and sequential and/or repeated peak force effects, experienced by the vehicle operator due to impact with the steering wheel.

Figure 1:
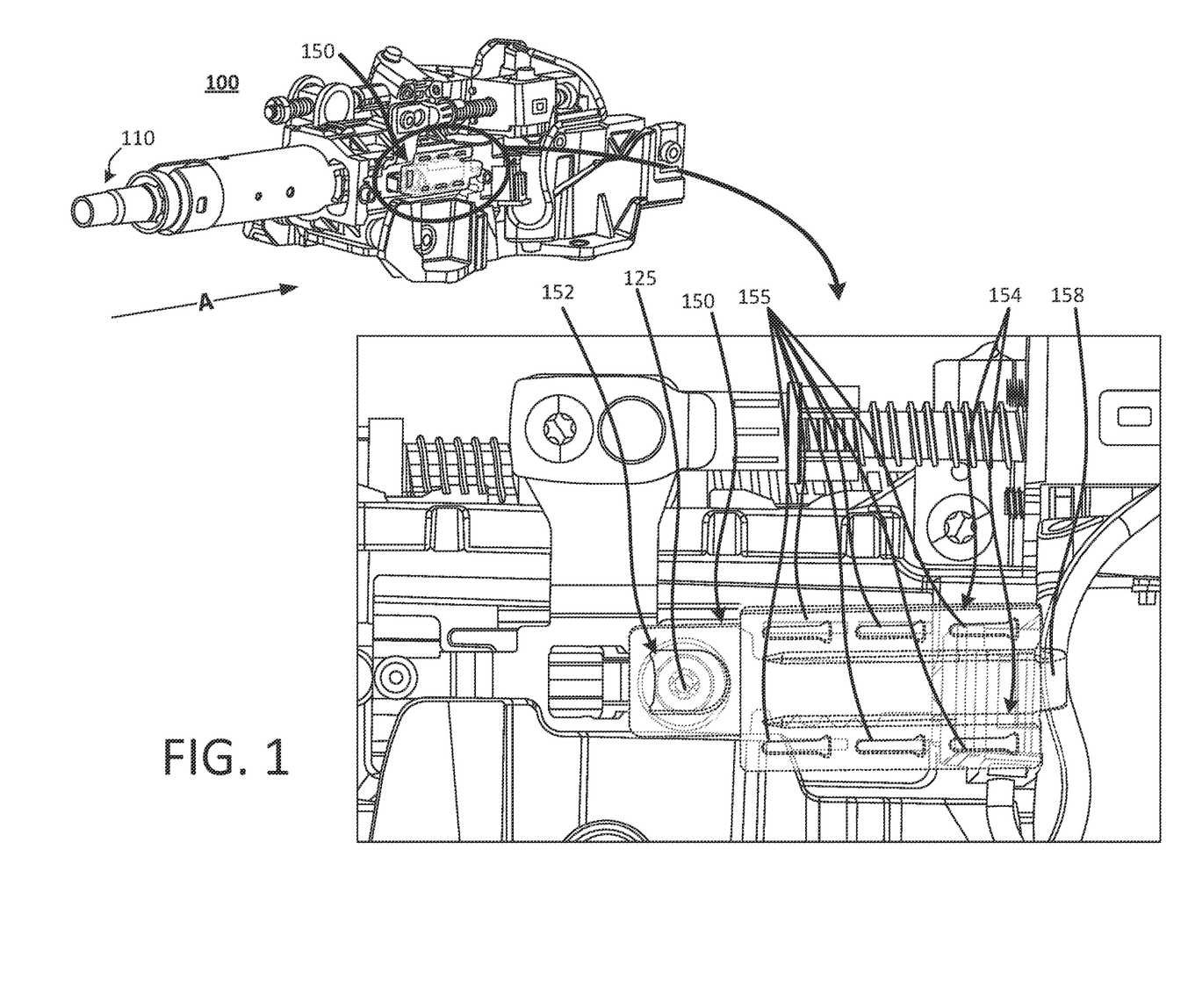
FIG. 1 illustrates an example collapsible steering column assembly.

FIG. 1 is a schematic view of an example collapsible steering column assembly 100. The example collapsible steering column assembly 100 shown in FIG. 1 includes a drive spindle 110 that is configured to be coupled to a steering wheel of a vehicle (not shown). The drive spindle 110 may be coupled to collapsible, or telescoping arrangement of shafts. The collapsible, or telescoping arrangement of shafts may be configured to collapse in response to a force applied to the collapsible steering column assembly 100/drive spindle 110 in the direction of the arrow A shown in FIG. 1. Such a force may be applied, for example, in the event of a frontal collision that drives the operator of the vehicle into the steering wheel as described above. In the example shown in FIG. 1, an energy absorbing device 150 is coupled between a fixed portion of the collapsible steering column assembly 100 and one or more movable, or collapsible portions, such as, for example, a telescoping arrangement of shafts coupled to the drive spindle 110. In the example arrangement shown in FIG. 1, a fastener 125, such as, for example a bolt, a rivet, a dowel or other type of fastening device, couples a first coupling portion 152 at a first end portion of the energy absorbing device 150 to a portion, for example a fixed portion, of the collapsible steering column assembly 100. A second coupling portion 154 of the energy absorbing device 150 may be coupled to a movable, or collapsible portion of the collapsible steering column assembly 100, such as, for example, a telescoping shaft of the collapsible steering column assembly 100. The second coupling portion 154 may be defined by a plurality of openings 155 in a plate portion of the energy absorbing device 150. In the event of a frontal crash that drives the drive spindle 110 and the telescoping arrangement of shafts in the direction of the arrow A, the energy absorbing device 150 may bend and/or tear at a tear portion 158. That is, in the event of such a frontal crash and movement of the drive spindle 110 and telescoping shafts in the direction of the arrow A, the first coupling portion 152 remains fixed to the fixed portion of the collapsible steering column assembly 100, and the second coupling portion 154 moves in the direction of the arrow A, together with the collapsing portion of the collapsible steering column assembly 100, causing tearing at the tear portion 158. The second coupling portion 154 can include more, or fewer openings 155 and/or combinations of openings 155 in different arrangements than shown.

Figure 2A:
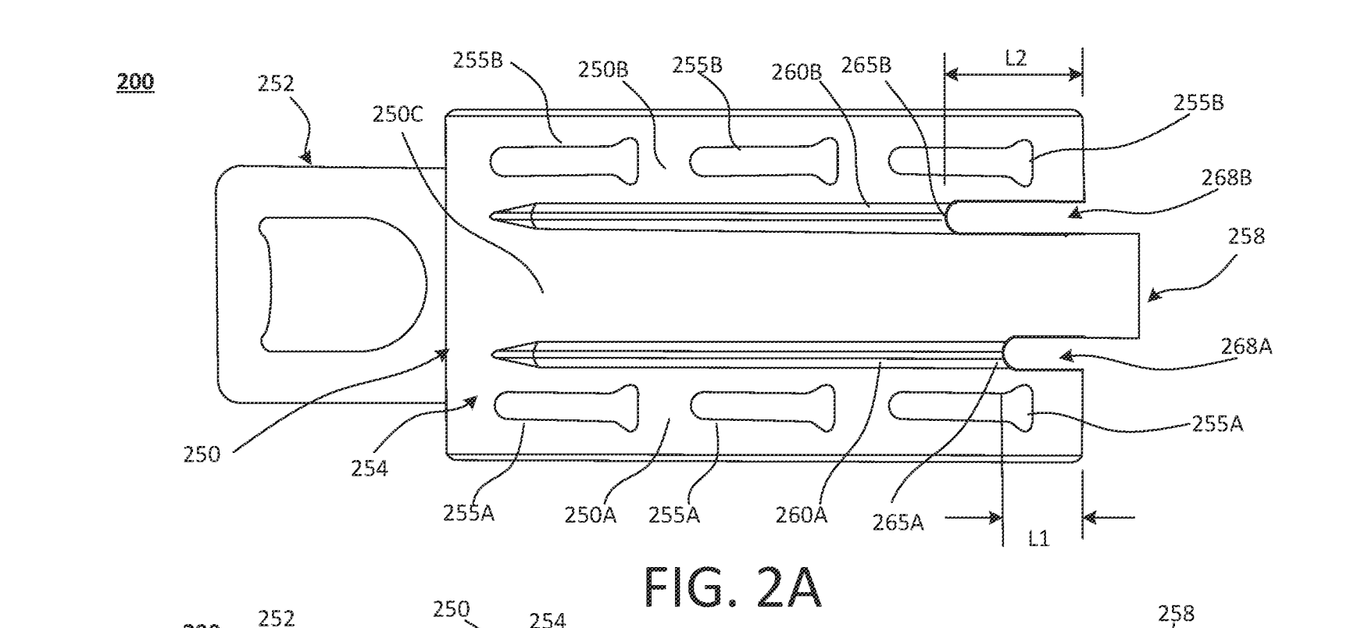
FIG. 2A is a plan view of an example energy absorbing device for a collapsible steering column assembly.
Figure 2B:
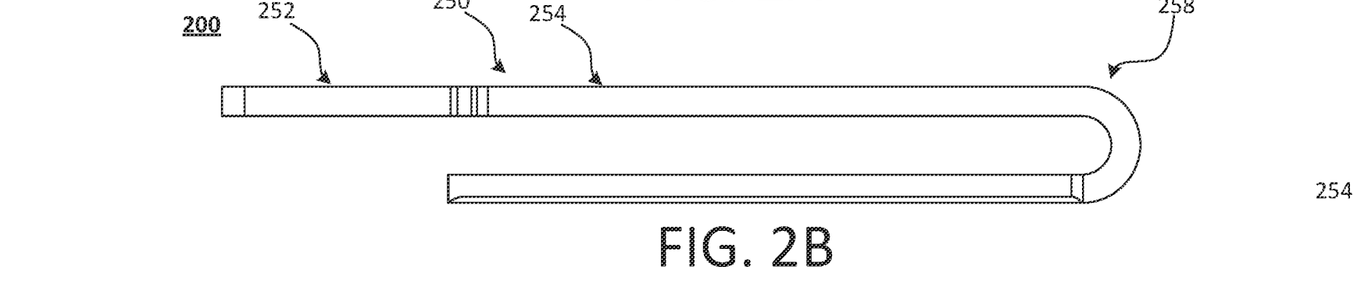
FIG. 2B is a side view of the example energy absorbing device shown in FIG. 2A.
Figure 2C:
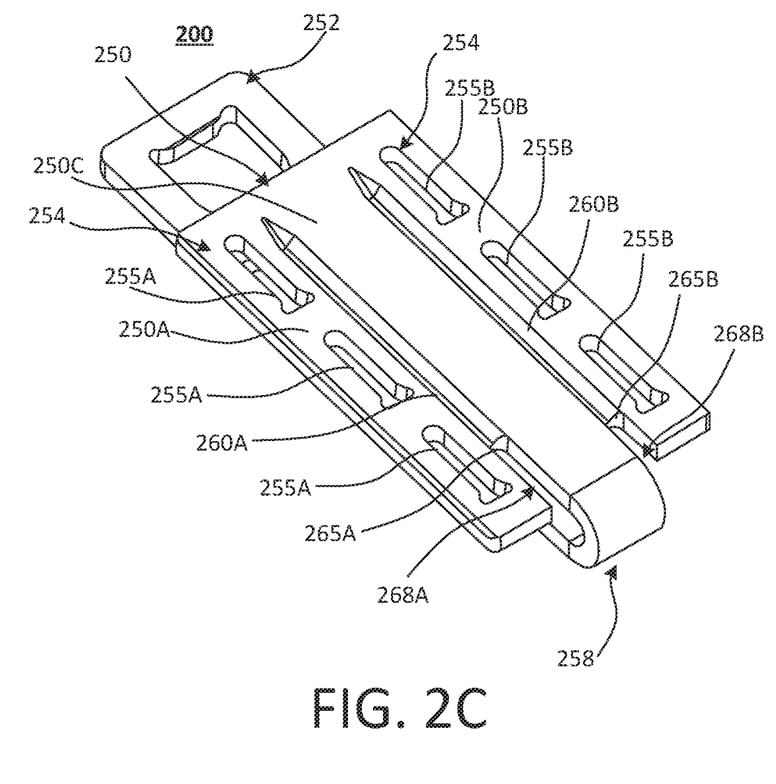
Figure 2D:
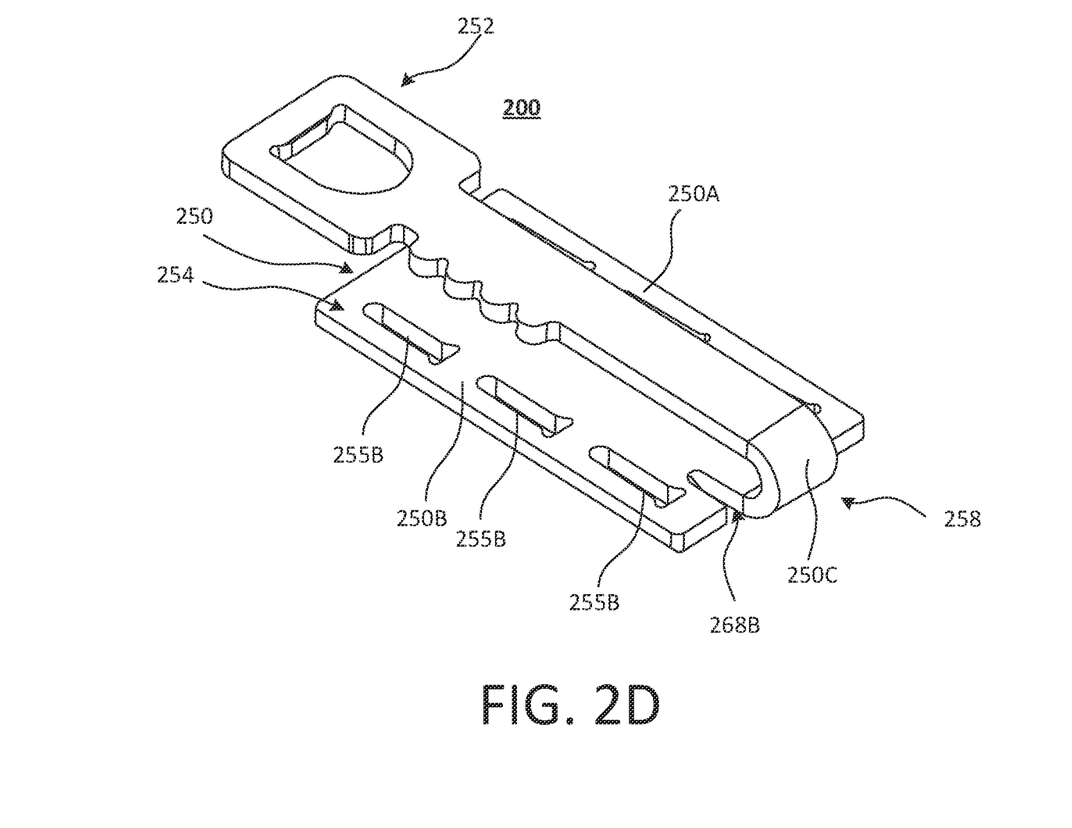
FIG. 2D is a second perspective view, of the example energy absorbing device shown in FIGS. 2A and 2B.
Figure 2E:
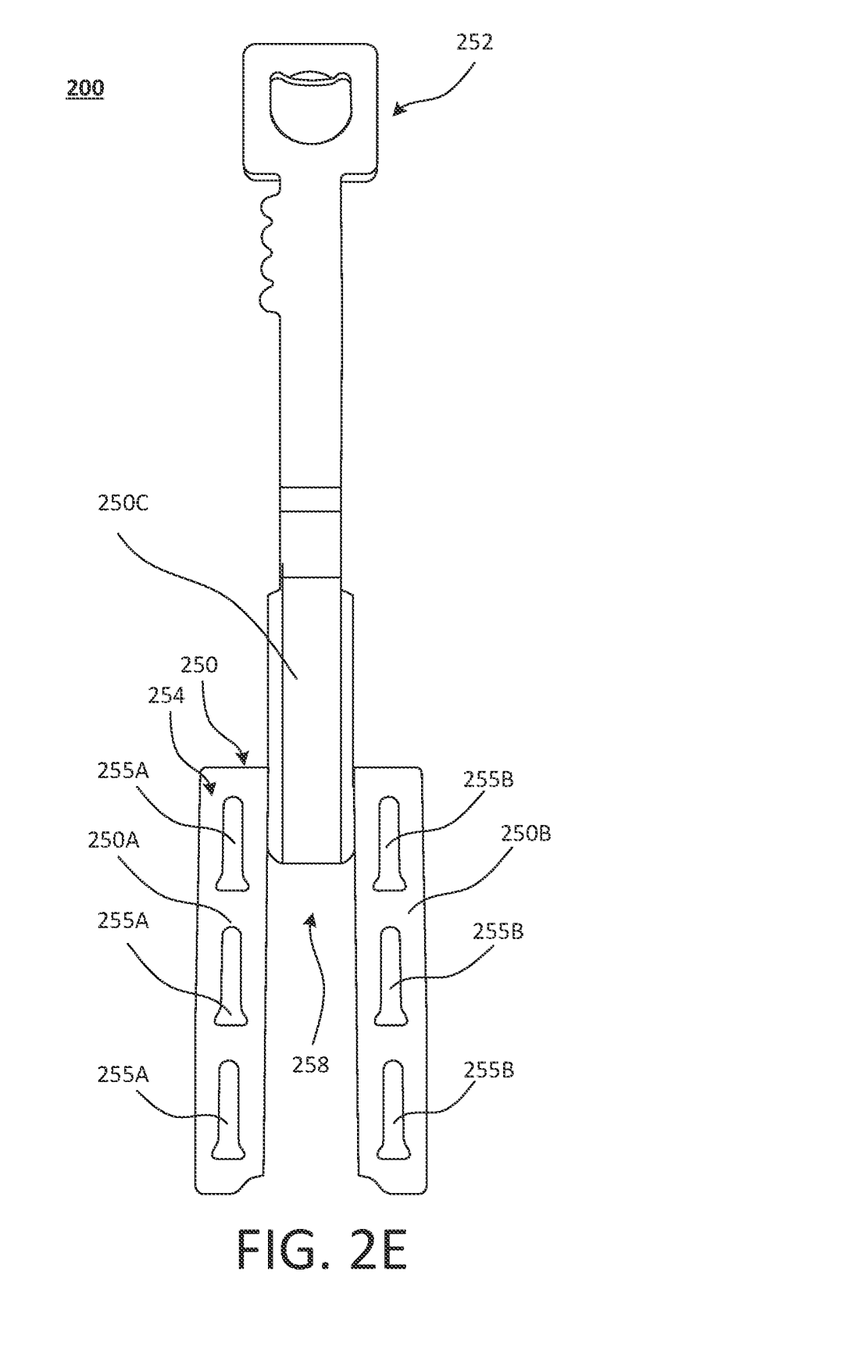
FIG. 2E is a plan view of the example energy absorbing device shown in FIGS. 2A-2D, in a torn configuration.
Figure 2F:
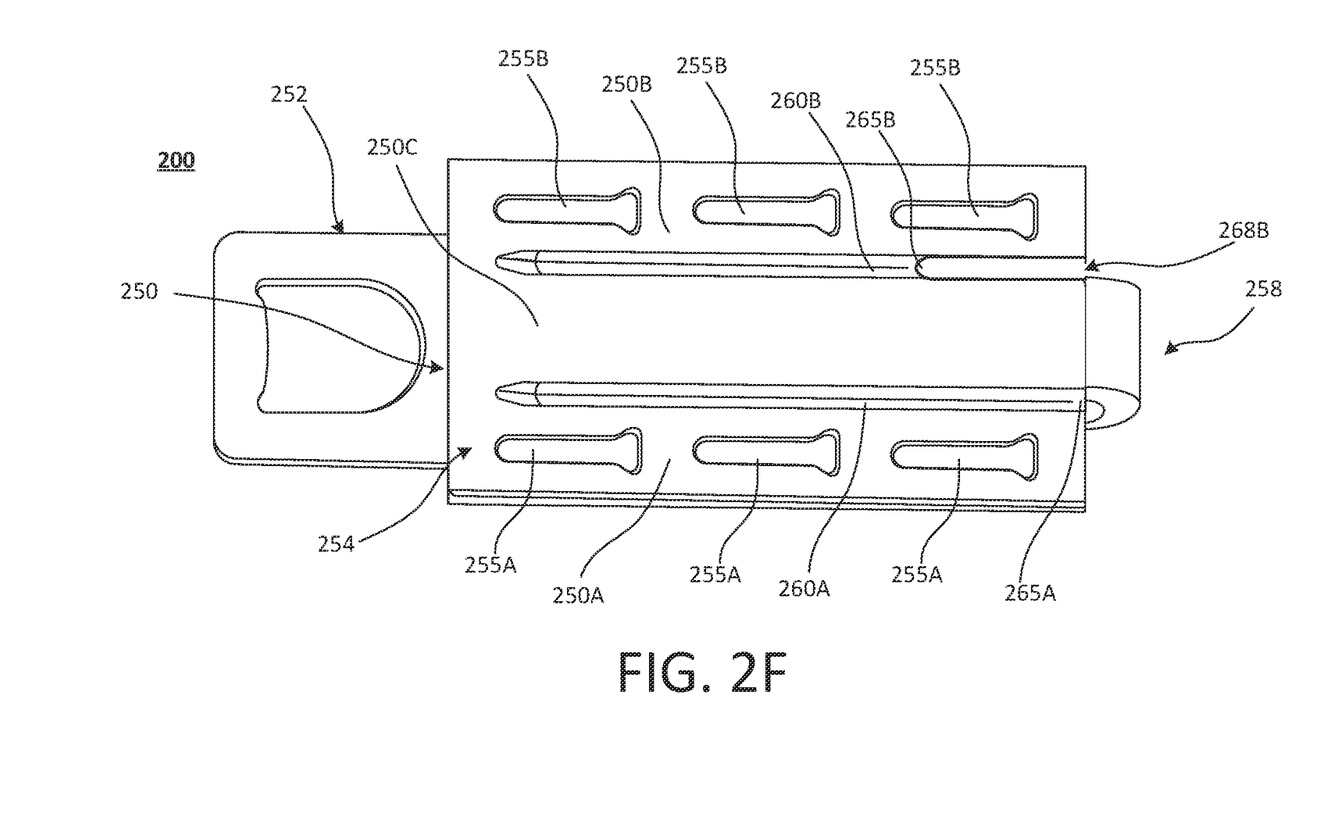
FIG. 2F is a plan view of an example energy absorbing device for a collapsible steering column assembly.

An example energy absorbing device 200 is shown in FIGS. 2A-2F. The example energy absorbing device 200 shown in FIGS. 2A-2F may be employed in a collapsible steering column assembly such as the example steering column assembly 100 described above with respect to FIG. 1. In particular, FIG. 2A is a plan view, and FIG. 2B is a side view, of the example energy absorbing device 200. FIG. 2C is a first perspective view, and FIG. 2D is a second perspective view of the example energy absorbing device 200. FIGS. 2A-2D illustrate an intact configuration of the example energy absorbing device 200. FIG. 2E illustrates a torn configuration of the example energy absorbing device 200. FIG. 2F is a plan view of another configuration of the example energy absorbing device 200.

The example energy absorbing device 200 includes a plate 250 having a first portion 250A, a second portion 250B, and a third portion 250C positioned between the first portion 250A and the second portion 250B. Grooves 260 may be defined between the first portion 250A, the second portion 250B, and the third portion 250C of the plate 250. In the example shown in FIG. 2A, a first groove 260A is defined between the first portion 250A and the third portion 250C of the plate 250, and a second groove 260B is defined between the second portion 250B and the third portion 250C of the plate 250. A first coupling portion 252 is formed at an end portion of the energy absorbing device 200. In some examples, the first coupling portion 252 may be defined by a tab and an opening formed at a tab end portion of the third portion 250C of the plate 250 (see FIGS. 2C and 2D). The first coupling portion 252 is configured to provide for coupling of the energy absorbing device 200 to a fixed portion of a collapsible steering column assembly (such as the example collapsible steering column assembly 100 described above with respect to FIG. 1, or other collapsible steering column assembly not explicitly shown). A second coupling portion includes a plurality of openings 255 formed in the plate 250. In the example shown in FIGS. 2A-2F, a first plurality of openings 255A is formed in the first portion 250A, and a second plurality of openings 255B is formed in the second portion of the plate 250. The second coupling portion 154, including the first plurality of openings 255A and the second plurality of openings 255B, is configured to be coupled to a movable, or collapsible component of the collapsible steering column assembly 100 such as, for example, a telescoping shaft of the collapsible steering column assembly 100. When coupled in this manner, in the event of a frontal crash (resulting in a force exerted on the collapsible steering column assembly 100 in the direction of the arrow A), the first coupling portion 252 remains in a substantially fixed position with respect to the collapsible steering column assembly 100, while the first portion 250A and the second portions 250B of the plate 250 move together with the collapsible portion of the steering column assembly 100. That is, the force exerted in the direction of the arrow A causes the third portion 250C of the plate 250 to tear away from the first and second portions 250A, 250B of the plate 250, as shown in FIG. 2E.

As noted above, the first groove 260A is formed between the first portion 250A and the third portion 250C of the plate 250, and the second groove 260B is formed between the second portion 250B and the third portion 250C of the plate 250. The first groove 260A and the second groove 260B may define guides for the tearing away of the third portion 250C from the first and second portions 250A, 250B of the plate 250 in response to the collapse of the components of the collapsible steering column assembly 100. Thus, the third portion 250C of the plate 250 may define a tear portion 258 of the energy absorbing device 200.

In some examples, a slit 268, for example, a tear initiation slit 268, may be formed at an initiation end of one or both of the first groove 260A and/or the second groove 260B. In the example shown in FIGS. 2A-2E, a first slit 268A having a length L1 is formed at the initiation end of the first groove 260A, and a second slit 268B having a length L2 is formed in the second groove 260B (see FIG. 2A). In this example arrangement, the length L2 of the second slit 268B is greater than the length L1 of the first slit 268A. The difference in the lengths L1, L2 of the first and second grooves 260A, 260B will cause a corresponding offset, or difference, in a point in time at which tearing of the third portion 250C from the respective first and second portion 250A, 250B occurs.

For example, in the example arrangement shown in FIGS. 2A-2D, in response to a force imparted on the collapsible steering column assembly 100 as described above, tearing between the first portion 250A and the third portion 250C at the first groove 260A will be initiated at a first point in time, corresponding to a tear initiation point 265A (see FIG. 2A) at a terminal end of the first slit 268A. Tearing between the second portion 250B and the third portion 250C at the second groove 260B will be initiated at a second point in time, corresponding to a terminal end (see FIG. 2A) of the second slit 268B, after tearing at the first groove 260A is already in progress. This offset between the points in time at which tearing is initiated in the respective first and second grooves 260A, 260B is afforded by the different lengths L1, L2 of the slits 268A, 268B cut in the grooves 260A, 260B. This offset between the point at which tearing is initiated may reduce the impact (on the operator of the vehicle) that is typically a product of start of separation of the collapsible components of the collapsible steering column assembly 100.

The example energy absorbing device 200 may dissipate energy across the stroke of the telescoping components during collapse of the steering column assembly 100. The offset of the initiation of tearing as described above with respect to FIGS. 2A-2E may reduce a peak force experienced by the operator of the vehicle in the event of a frontal crash, associated with the initiation of tearing of the energy absorbing device 200. The offset of the initiation of tearing as described above may also reduce the impact of bending of components of the steering column assembly 100 during a frontal crash situation. Without this offset, bending of components can otherwise inhibit and/or stop the tearing of an energy absorbing device, can otherwise reduce the effectiveness of the collapsible features of the steering column assembly 100 including an energy absorbing device, and can result in physical injury to the operator.

The example energy absorbing device 200 described above with respect to FIGS. 2A-2E, the tear initiation point 265A of the first tear initiation slit 268A is offset from the tear initiation point 265B of the second tear initiation slit 268B, and initiation of a tearing action (i.e., a point in time at which tearing is initiated) is offset accordingly. The relative sizes, dimensions, configurations and the like of the first tear initiation slit 268A and the second tear initiation slit 268B as shown in FIGS. 2A-2E are provided for purposes of discussion and illustration. The principles described herein are applicable to other combinations of tear initiation slits, including different amounts of offset between tear initiation slits. The principles described herein are applicable to a combination in which one of the grooves 260 includes a tear initiation slit 268, and the other of the grooves 260 does not include a tear initiation slit 268, a combination including more tear initiation slits 268 offset tear initiation points 265 than shown, and the like.

An example in which the first groove 260A does not include a tear initiation slit, and the second groove 260B does include a tear initiation slit 268B, is shown in FIG. 2F. In this example arrangement, the tear initiation point 265A of the first groove 260A corresponds to the proximal end portion of the first groove 260A. In this example arrangement, the second tear initiation point 265B remains offset relative to the first tear initiation point 265A. The offset between the tear initiation points 265 (265A, 265B) of the grooves 260 (260A, 260B, respectively), either as shown or in other combination(s) thereof, and the associated offset in the initiation of tearing of the plate portion 250 of the energy absorbing device 200, reduces the effect of the impact from dynamic force increases associated with the start of separation and/or collapse of the components of the collapsible steering column assembly, and the impact of bending of components of the steering column assembly during a frontal crash situation, as described above.

Figure 3:
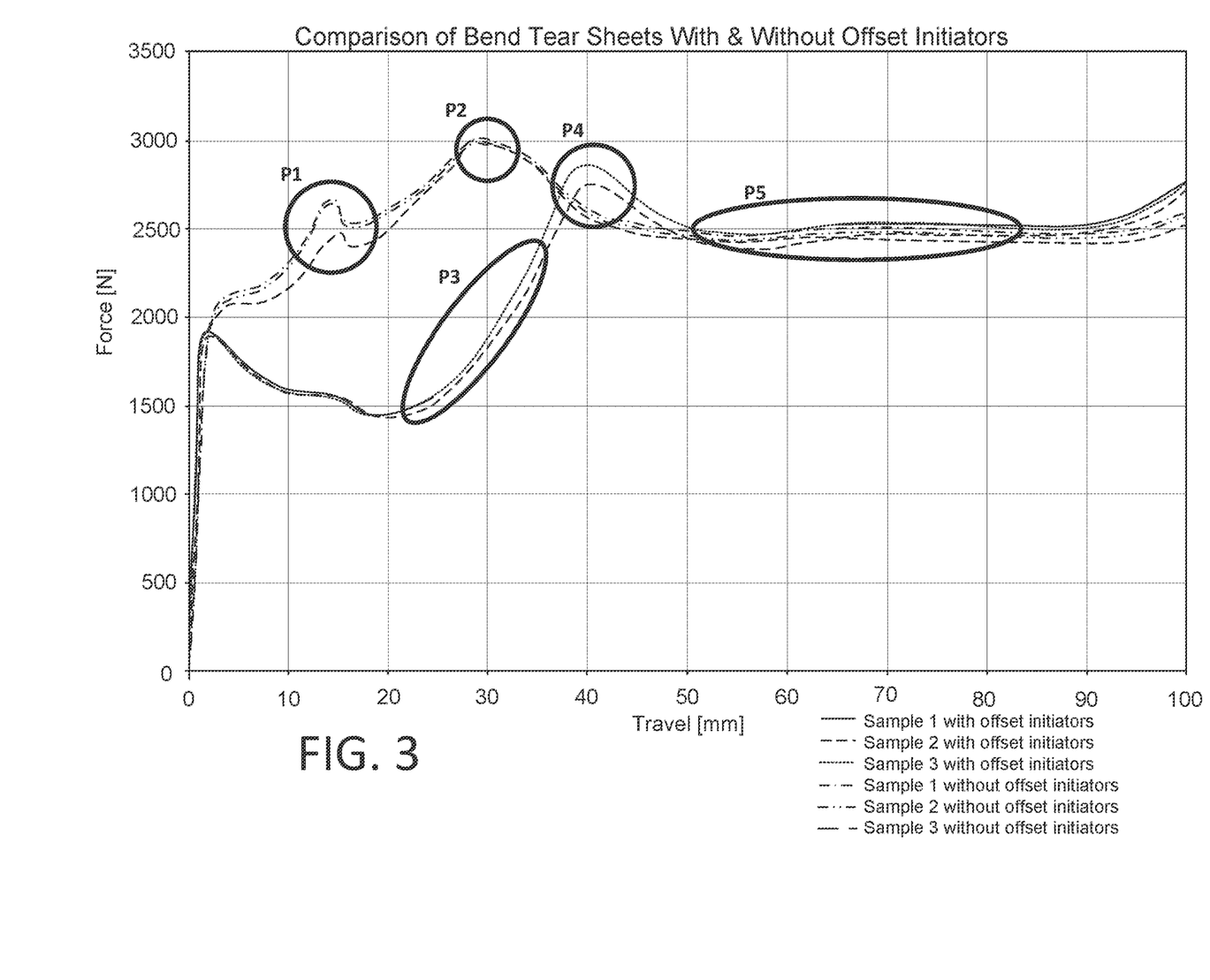
FIG. 3 is a graph of running loads associated with components of a collapsible steering column assembly.

FIG. 3 is a graph of running loads associated with components of a collapsible steering column assembly in the event of a frontal crash for which collapse of the components of the collapsible steering column assembly is initiated, i.e., force imparted on the collapsible steering assembly as an operator impacts the steering wheel during a frontal crash. In particular, FIG. 3 illustrates the force experienced by an energy absorbing device as a function of an amount of travel of the collapsible components of the steering column assembly. FIG. 3 includes data collected for an energy absorbing device, such as the example energy absorbing device 200 described above with respect to FIGS. 2A-2F, including tear initiation slits 268A, 268B having offset tear initiation points 265A, 265B. FIG. 3 also includes data collected for an energy absorbing device that does not include offset tear initiation slits, to provide a basis for comparison.

As noted above, a consistent force across substantially the full stroke of the steering column assembly in response to impact, and subsequent collapse may help reduce physical injury to the operator of the vehicle during a frontal collision. As shown in FIG. 3, in a collapsible steering column having an energy absorbing device that does not include offset tear initiation slits as described above, a peak force is experienced as shown at P1 and again at P2. The peak forces experienced at P1 and P2 are the result of forces imparted on the steering column assembly as the operator impacts the steering wheel. For example, as the impact occurs and the vehicle comes to an abrupt stop while the operator continues to move forward, the operator may impact the steering wheel and experience a first peak force at P1. The operator may experience a second force at P2, as the tear portion of an energy absorbing device (such as the tear portion 258 of the energy absorbing device 200) begins to deform, or tear away, and encounters the proximal ends of grooves formed in the energy absorbing device. That is, even in an energy absorbing device including grooves that guide tearing of the tear portion, without any tear initiation slits that would otherwise facilitate tearing and/or offset the initiation of tearing at the grooves, overcoming the force needed to initiate tearing in the grooves may cause the user to experience the second peak force at P2. As the peak forces exerted at P1 and P2 represent peak forces that would be experienced by the operator as the operator impacts the steering wheel, this may potentially result in more severe injury to the operator, particularly when the operator experiences these types of peak forces twice, i.e., at P1 and P2.

In contrast, as shown in FIG. 3, an energy absorbing device, such as the example energy absorbing device 200 including offset tear initiation slits 268A, 268B respective formed in the grooves 260A, 260B may experience a delay in the onset of a peak force, and may produce a relatively constant load, or force, through the stroke of the steering column assembly during collapse. For example, as shown in FIG. 3, a single peak force is experienced at P4 (rather than twice, at P1 and P2, as described above) when the initiation of tearing of the energy absorbing device 200 is offset by the offset tear initiation slits 268A, 268B respectively formed in the grooves 260A, 260B. In this arrangement, the single peak force at P4 is preceded by a gradual increase in force P3, and is followed by a substantially constant force at P5. The force profile associated with the example energy absorbing device 200 including offset tear initiation slits 268A, 268B respectively formed in the grooves 260A, 260B may reduce injury to the operator as a result of these impact forces.

Figure 4A:
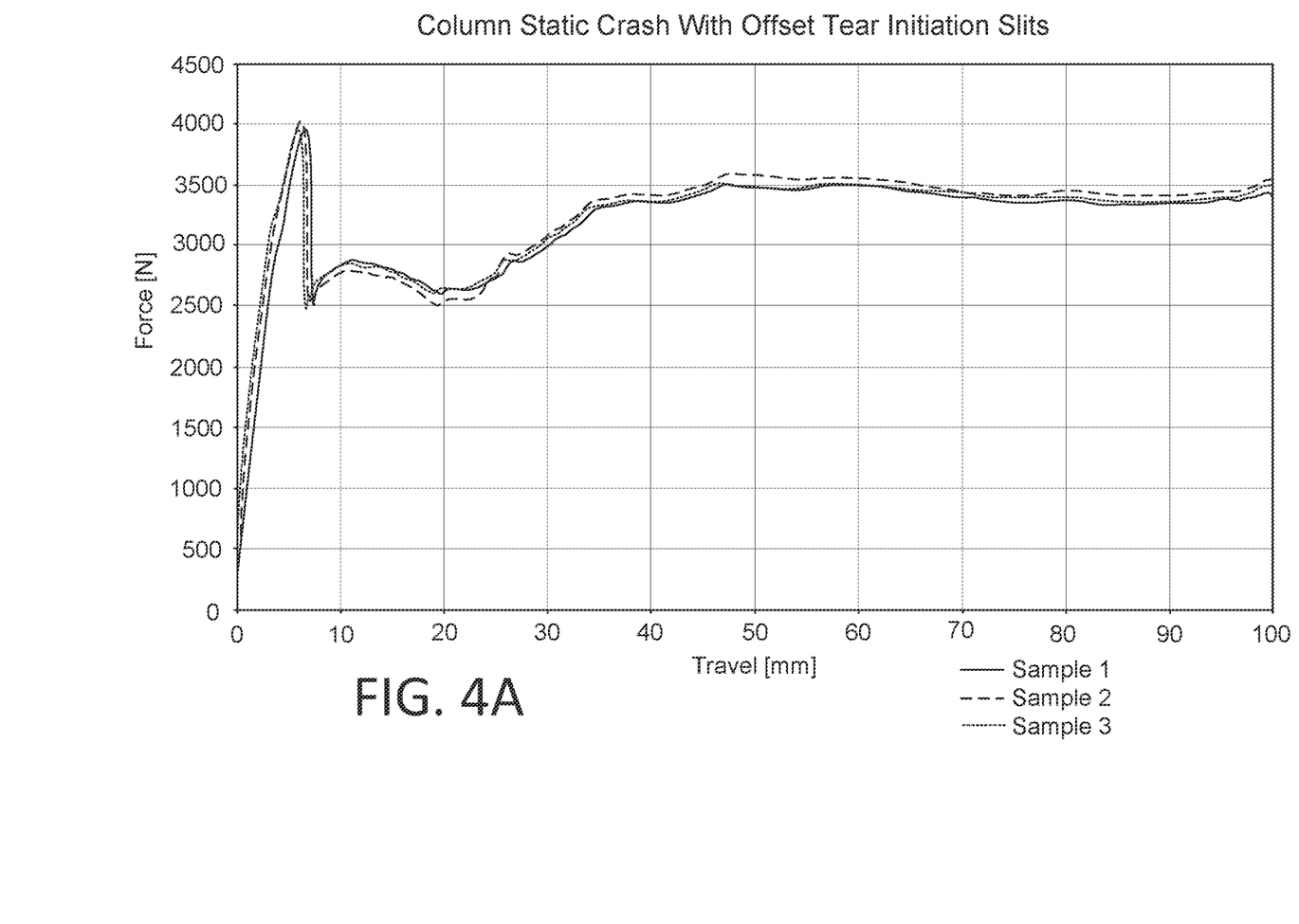
FIGS. 4A and 4B are graphs of force imparted on a collapsible steering column assembly as a function of amount of travel of collapsible components of the steering column assembly.
Figure 4B:
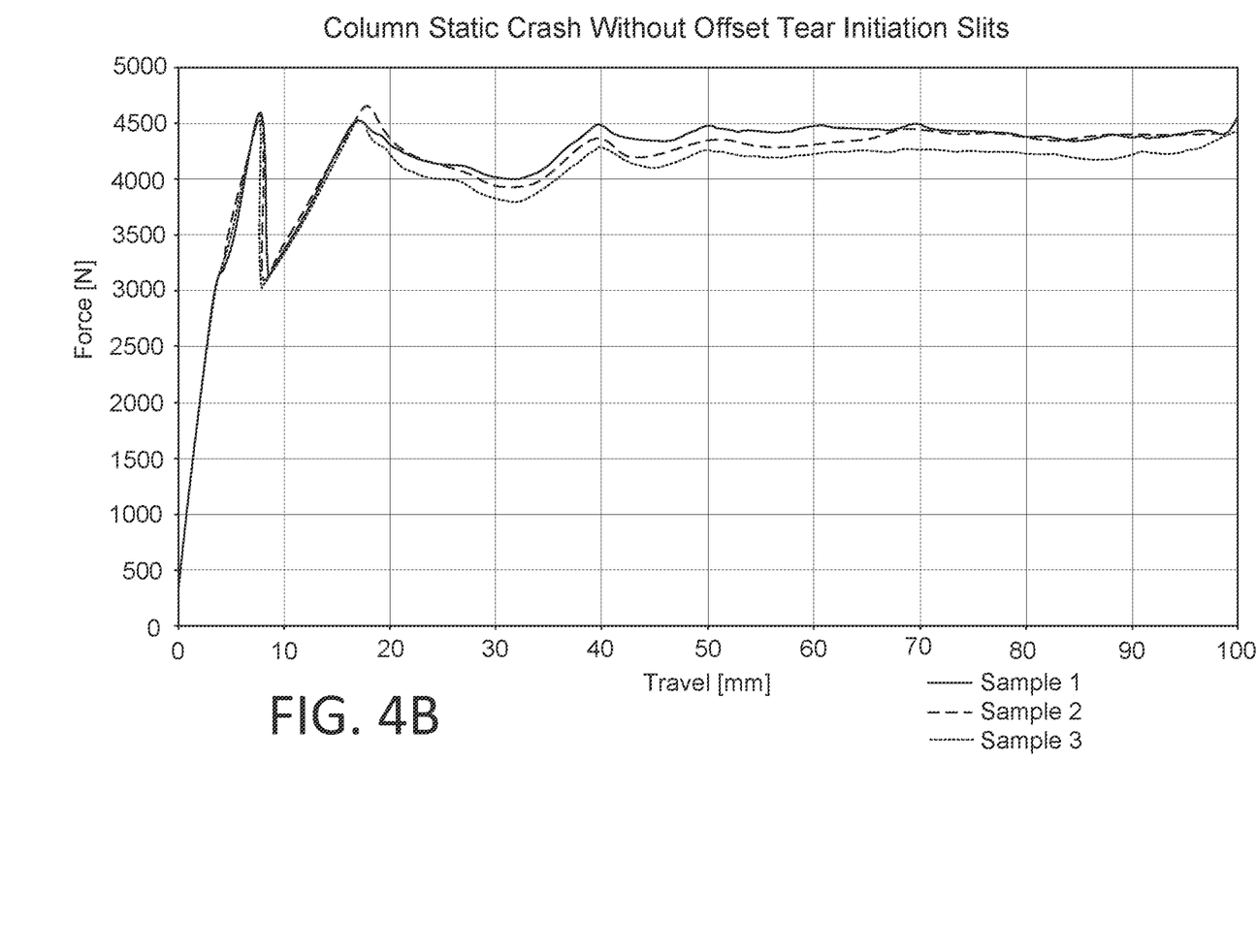

FIG. 4A illustrates force imparted on a collapsible steering column assembly as a function of an amount of travel of the collapsible components of the steering column assembly. In FIG. 4A, the collapsible steering column assembly includes an energy absorbing device, such as the example energy absorbing device 200 described above with respect to FIGS. 2A-2F, including offset tear initiation slits 268A, 268B. FIG. 4B illustrates force imparted on a collapsible steering column assembly as a function of amount of travel of the collapsible components of the steering column assembly, including an energy absorbing device that does not include offset tear initiation slits, to provide a basis for comparison.

A comparison of FIGS. 4A and 4B illustrates that a collapsible steering column assembly having an energy absorbing device, such as the example energy absorbing device 200 including offset tear initiation slits 268A, 268B, may delay an onset of a peak force, and may produce a relatively constant load, or force, through the stroke of the steering column assembly during collapse. That is, as shown in FIG. 4B, in a collapsible steering column having an energy absorbing device that does not include offset tear initiation slits as described above, multiple peak forces are imparted on the steering column assembly as the operator impacts the steering wheel, potentially resulting in more severe injury to the operator, particularly when the operator experiences these types of peak forces twice.

Figure 5:
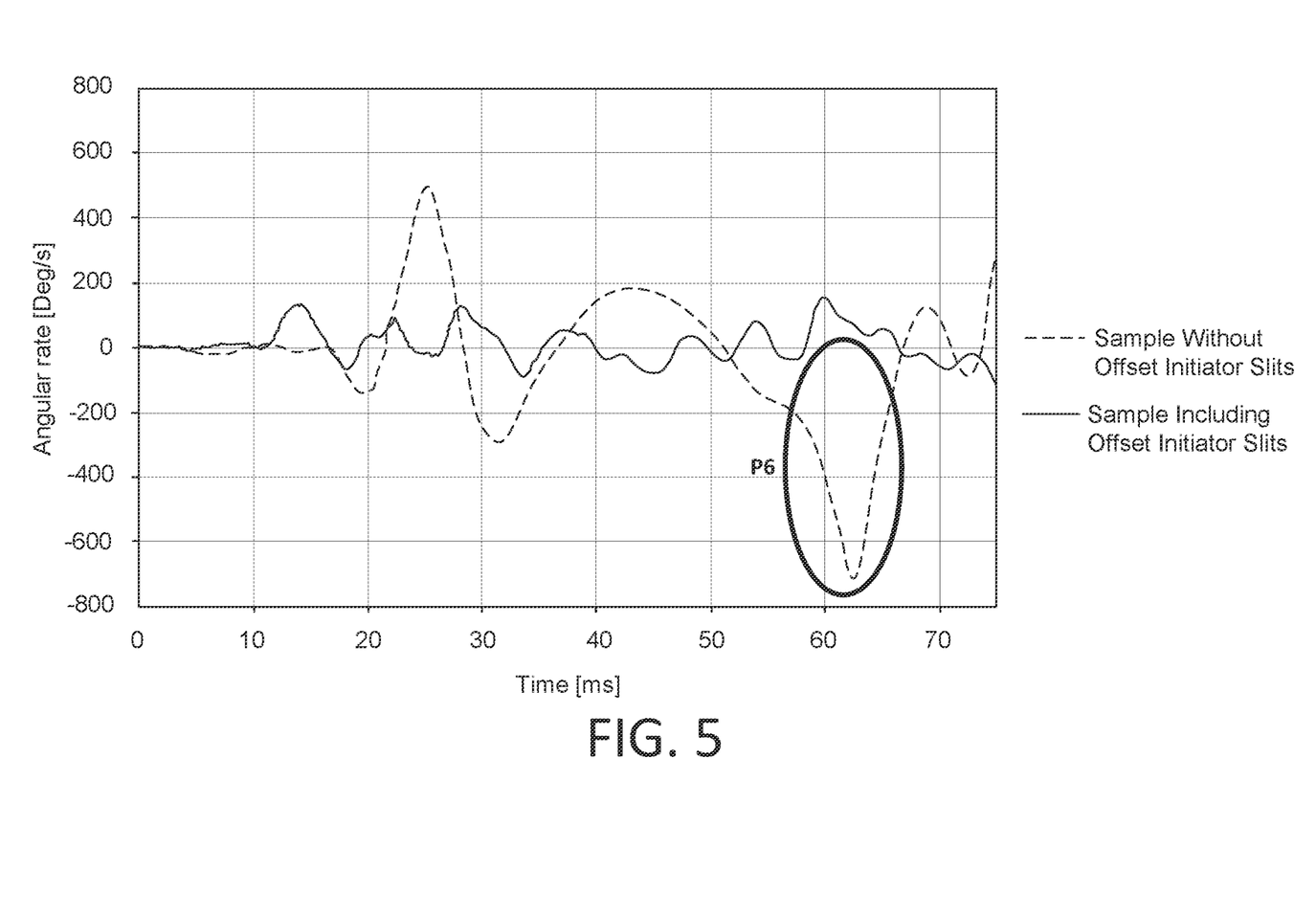
FIG. 5 is a graph of bending load associated with components of a collapsible steering column assembly.

FIG. 5 is a graph of bending load over time, associated with components of a collapsible steering column assembly in the event of a frontal crash for which collapse of the components of the collapsible steering column assembly is initiated, i.e., force imparted on the collapsible steering assembly as an operator impacts the steering wheel during a frontal crash. In particular, FIG. 5 illustrates bending load experienced by a steering column assembly including an energy absorbing device, such as the example energy absorbing device 200 described above with respect to FIGS. 2A-2F, including offset tear initiation slits 268A, 268B. FIG. 5 also includes data collected for an energy absorbing device that does not include offset tear initiation slits, to provide a basis for comparison.

In the event of a frontal crash, as the vehicle stops abruptly but the operator continues to travel toward the steering wheel/steering column assembly, components of the steering column assembly that includes an energy absorbing device without offset tear initiation slits may start to bend upwards instead of collapsing, as shown at P6 in FIG. 5. The upward bending of the steering column assembly components will preclude further collapse, or telescoping, of the components, and can result in further injury to the operator. In contrast, as shown in FIG. 5, upward bending of the components of the steering collapsible steering column assembly can be avoided by the steering column assembly including an energy absorbing device, such as the example energy absorbing device 200 described above with respect to FIGS. 2A-2F, including offset tear initiation slits 268A, 268B. That is, the offset of the tear initiation slits 268A, 268B respectively formed in the grooves 260A, 260B, and the corresponding offset of the initiation of tearing of the energy absorbing device 200 provides for a relatively more consistent load over time, thus reducing the potential for injury to the operator.

In the implementations described above, the first tear initiation slit 268A and/or the second tear initiation slit 268B are characterized as portions of the grooves 260A and/or 260B that are pre-cut, or pre-torn, for purposes of discussion and illustration, so that the initiation of tearing of the grooves 260A, 260B is offset, and the load is more evenly distributed over time. In some implementations, the energy absorbing device 200 may have grooves 260A, 260B including ramped portions (not shown) having a gradually increasing thickness from a proximal end to a distal end thereof at which the tear initiation point 265A, 265B is defined. The gradually increasing thickness of the ramped portions of the grooves 260A, 260B may function similarly to the tear initiation slits 268A, 268B in that the initiation of tearing of the grooves 260A, 260B is offset, and the load is more evenly distributed over time.

Terms such as "substantially" and "about" used herein are used to describe and account for small fluctuations, such as due to variations in processing. Also, when used herein, indefinite articles such as "a" or "an" may refer to "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, any logic flows depicted herein do not require the particular order shown, or sequential order, to achieve desirable results. In addition, other processes may be provided, or processes may be eliminated, from the described flows, and other components may be added to and/or removed from the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An energy absorbing device for a steering column assembly, the energy absorbing device comprising:
   a plate, including:
      a first portion;
      a second portion, wherein the first portion and the second portion are configured to be coupled to one or more movable components of the steering column assembly; and
      a third portion positioned between the first portion and the second portion, wherein the third portion is configured to be coupled to a stationary component of the steering column assembly;
   a first groove between the first portion and the third portion;
   a second groove between the second portion and the third portion; and
   at least one tear initiation slit formed in one of the first groove or the second groove, wherein the at least one tear initiation slit includes:
      a first tear initiation slit formed in the first groove, the first tear initiation slit having a first length; and
      a second tear initiation slit formed in the second groove, the second tear initiation slit having a second length that is greater than the first length of the first tear initiation slit formed in the first groove;
   wherein tearing of the first groove is initiated before tearing of the second groove is initiated due to an offset between the first length of the first tear initiation slit and the second length of the second tear initiation slit.

2. The energy absorbing device of claim 1, wherein the at least one tear initiation slit has a first tear initiation point that is offset relative to a second tear initiation point of the other of the first groove or the second groove.

3. The energy absorbing device of claim 1, wherein an initiation of tearing of the second groove is offset from an initiation of tearing of the first groove based on the second length of the second tear initiation slit being greater than the first length of the first tear initiation slit.

4. The energy absorbing device of claim 3, wherein the offset between the second length of the second tear initiation slit and the first length of the first tear initiation slit corresponds to an offset between the initiation of tearing of the second groove and the initiation of tearing of the first groove.

5. The energy absorbing device of claim 1, wherein the third portion of the plate defines a tear portion of the energy absorbing device that separates from the first portion and the second portion of the plate in response to tearing at the first groove and the second groove.

6. The energy absorbing device of claim 1, further comprising a coupling portion configured to provide for coupling of the energy absorbing device to the stationary component of the steering column assembly.

7. The energy absorbing device of claim 6, wherein the coupling portion is defined by a tab and an opening formed at a tab end portion of the third portion.

8. An energy absorbing device for a steering column assembly, the energy absorbing device comprising:
   a plate, including:
      a first portion;
      a second portion, wherein the first portion and the second portion are configured to be coupled to one or more movable components of the steering column assembly; and
      a third portion positioned between the first portion and the second portion, wherein the third portion is configured to be coupled to a stationary component of the steering column assembly:
   a first groove between the first portion and the third portion;
   a second groove between the second portion and the third portion; and
   at least one tear initiation slit formed in one of the first groove or the second groove;
   wherein the at least one tear initiation slit includes no tear initiation slit formed in the first groove, and a tear initiation slit formed in the second groove, wherein an initiation of tearing of the second groove is offset from an initiation of tearing of the first groove, such that tearing of the first groove is initiated before tearing of the second groove.

9. The energy absorbing device of claim 8, further comprising a coupling portion configured to provide for coupling of the energy absorbing device to the stationary component of the steering column assembly.

10. The energy absorbing device of claim 9, wherein the coupling portion is defined by a tab and an opening formed at a tab end portion of the third portion.

11. A steering column assembly, comprising:
a drive spindle;
a telescoping shaft coupled to the drive spindle; and
an energy absorbing device, including:
  a first plate portion coupled to a portion of the telescoping shaft;
  a second plate portion coupled to a portion of the telescoping shaft; and
  a third plate portion positioned between the first plate portion and the second plate portion and coupled to the drive spindle;
  a first groove between the first plate portion and the third plate portion;
  a second groove between the second plate portion and the third plate portion; and
  a first tear initiation slit formed in the first groove; and
  a second tear initiation slit formed in the second groove of the energy absorbing device, wherein the first tear initiation slit has a first length, and the second tear initiation slit formed in the second groove has a second length that is greater than the first length of the first tear initiation slit formed in the first groove, wherein an initiation of tearing of the second groove is offset from an initiation of tearing of the first groove based on the second length of the second tear initiation slit being greater than the first length of the first tear initiation slit, and wherein tearing of the first groove is initiated before tearing of the second groove is initiated due to an offset between the first length of the first tear initiation slit and the second length of the second tear initiation slit.

12. The steering column assembly of claim 11, wherein a tear initiation point of the first groove formed in the energy absorbing device is offset relative to a tear initiation point of the second groove formed in the energy absorbing device.

13. The steering column assembly of claim 11, wherein the offset between the second length of the second tear initiation slit and the first length of the first tear initiation slit corresponds to the offset between the initiation of tearing of the second groove and the initiation of tearing of the first groove.

14. The steering column assembly of claim 11, wherein the third plate portion defines a tear portion of the energy absorbing device that separates from the first plate portion and the second plate portion in response to tearing at the first groove and the second groove.

15. The steering column assembly of claim 11, wherein the energy absorbing device further comprises a coupling portion configured to provide for coupling of the energy absorbing device to a stationary component of the steering column assembly.

16. The steering column assembly of claim 15, wherein the coupling portion is defined by a tab and an opening formed at a tab end portion of the third plate portion.

17. A steering column assembly, comprising:
a drive spindle;
a telescoping shaft coupled to the drive spindle; and
an energy absorbing device, including:
  a first plate portion coupled to a portion of the telescoping shaft;
  a second plate portion coupled to a portion of the telescoping shaft;
  a third plate portion positioned between the first plate portion and the second plate portion and coupled to the drive spindle;
  a first groove between the first plate portion and the third plate portion;
  a second groove between the second plate portion and the third plate portion; and
  a first tear initiation slit formed in the first groove;
  wherein no tear initiation slit is formed in the second groove, and wherein an initiation of tearing of the first groove is offset from an initiation of tearing of the second groove, such that tearing of the second groove is initiated before tearing of the first groove.

18. The steering column assembly of claim 17, wherein the energy absorbing device further comprises a coupling portion configured to provide for coupling of the energy absorbing device to a stationary component of the steering column assembly.

19. The steering column assembly of claim 18, wherein the coupling portion is defined by a tab and an opening formed at a tab end portion of the third plate portion.

* * * * *

UNITED STATES PATENT AND TRADEMARK OFFICE
CERTIFICATE OF CORRECTION

| | |
|---|---|
| PATENT NO. | : 12,384,445 B2 |
| APPLICATION NO. | : 18/713815 |
| DATED | : August 12, 2025 |
| INVENTOR(S) | : Ng et al. |

Page 1 of 1

It is certified that error appears in the above-identified patent and that said Letters Patent is hereby corrected as shown below:

In the Claims

In Column 10, Claim 8, Line 52, delete "assembly:" and insert -- assembly; --, therefor.

Signed and Sealed this
Twenty-eighth Day of October, 2025

John A. Squires
*Director of the United States Patent and Trademark Office*